United States Patent [19]

Kuznicki et al.

[11] Patent Number: 5,011,667
[45] Date of Patent: Apr. 30, 1991

[54] SELF-BOUND SODIUM CHABAZITE AGGREGATES AND METHODS FOR PREPARATION THEREOF

[75] Inventors: Steven M. Kuznicki, Easton, Pa.; John R. Whyte, Jr., New York, N.Y.

[73] Assignee: Engelhard Corporation, Iselin, N.J.

[21] Appl. No.: 242,014

[22] Filed: Sep. 8, 1988

[51] Int. Cl.$^5$ .............................. C01B 33/34
[52] U.S. Cl. ........................... 423/118; 423/326; 423/328; 423/329; 423/330; 502/64; 502/67; 502/68; 502/70
[58] Field of Search ............... 423/328 C, 118, 329, 423/326, 330; 502/64, 67, 68, 70

[56] References Cited

U.S. PATENT DOCUMENTS

| 3,030,181 | 4/1962 | Milton | 423/328 C |
| 3,327,272 | 5/1967 | Kerr | 423/329 |

FOREIGN PATENT DOCUMENTS

| 59-26922 | 2/1984 | Japan | 423/328 C |
| 1047943 | 11/1966 | United Kingdom | 423/328 C |
| 1092681 | 11/1967 | United Kingdom | 423/328 C |

Primary Examiner—Gary P. Straub
Assistant Examiner—Stuart L. Hendrickson

[57] ABSTRACT

A process for making self-bound monolithic bodies of chabazite by mixing finely divided chabazite and a sodium aluminosilicate gel into monolithic bodies, the gel having a molar ratio of silica to aluminum between 1.0 and 1.5 and a molar ratio of sodium to silica from 0.35 to 0.55, and heating the monolithic bodies in the presence of water to convert the gel to additional chabazite.

3 Claims, 2 Drawing Sheets

SELF-BOUND SODIUM CHABAZITE AGGREGATES AND METHODS FOR PREPARATION THEREOF

FIELD OF THE INVENTION

The invention relates to self-bound sodium chabazite aggregates and to the preparation thereof by crystallizing sodium chabazite in precursor aggregates composed of ground chabazite and sources of oxides of sodium, aluminum and silicon.

BACKGROUND OF THE INVENTION

Chabazite is the only natural zeolite currently employed commercially to any significant extent. This utility results from unique ion-exchange selectivities and high acid tolerance in adsorptive applications. Most notably, high ion-exchange selectivity towards $^{137}Cs^+$, the largest radioactive component in nuclear reactor waste water streams, results in its employment as a radionuclide scavenger. Secondly, the high acid stability of naturally ocurring chabazite compared to synthetic zeolites makes chabazite the desiccant of choice for commercial use in certain gas streams.

Before any zeolite can be employed in a commercial adsorption or ion-exchange process, powdered material must be formed into macroscopic aggregates so that vapors or liquids may flow through a bed of the material at reasonable throughput and applied pressure. Classical aggregation is achieved by compounding a given zeolite with a binder such as a clay mineral or a 'gluing' agent such as a soluble silicate. Unfortunately these binding agents, which may constitute a substantial weight fraction of the finished aggregates, are generally inert with respect to ion-exchange or adsorption, and thereby dilute the desirable properties of the active zeolite component in the moieties. Inert binding agents can also hinder mass transfer of exchangeable ions or adsorbate molecules to active sites. Both of these effects are highly undesirable.

Attempts to overcome the dilution effect of the binders have generally centered on either identification of more effective binders, i.e. those required in lesser amounts, or on the partial or complete conversion of a binding agent to an active phase, sometimes resulting in essentially pure self-bound aggregates with equilibrium ion-exchange and adsorptive properties rivaling those of pure, unbound powders of the same species. See U.S. Pat. No. 4,603,040, Kuznicki et. al.

Extensive ion-exchange and adsorption testing has revealed that unbound sodium chabazite has substantially higher adsorption and ion-exchange capacities than commercial mixed cation chabazite aggregates. The belief that a substantial portion of the capacity is lost due to binder dilution lead to attempts to identify a binder which could be partially or completely converted to chabazite.

THE INVENTION

It has now been discovered that high-purity, self-bound sodium chabazite aggregates can be prepared by the conversion of appropriate mixtures of pure or substantially pure sodium chabazite powder and certain aluminosilicate gels to produce coherent aggregates. The sodium aluminosilicate gels used in the practice of the invention are those capable of being converted by hydrothermal treatment into high purity synthetic sodium chabazite. According to Barrer (*Hydrothermal Chemistry of Zeolites*, Academic Press, London, 1982, p196-203) suitable gels would have a composition of $Na_2O \cdot Al_2O_3 \cdot xSiO_2$, where x should range from about 6 to about 10. In addition, excess base should be present in a conversion solution at a concentration of 40 to 60 milligrams of $Na_2O$ per liter of water. Recommended conversion temperature could be between 50° and 150° C. By trial-and-error, chabazite was grown in the practice of the present invention from gels with significantly lower x values and with solutions of slightly lower excess $Na_2O$ in solution. The preferred emobodiment of this invention uses a gel composition (corrected for extra silica and alumina from impurities in the chabazite) with a silicon-to-aluminum ratio of about 3. An excess base level of about 26 mg/l is used in the preferred embodiment of this invention. The lower silica and base requirements are attributed to the possible templating or seeding effect of the original chabazite.

The novel aggregates of this invention not only possess superior mechanical strength, ion-exchange and adsorptive properties, in comparison to classically bound chabazite aggregates, but, unexpectedly, may exceed the ion-exchange and adsorptive capacities of the pure sodium chabazite starting material. Typically, the self-bound aggregates have adsorptive and ion-exchange capacities 30 to 50% greater than commercially available, classically bound, mixed cation chabazite adsorbents and ion-exchange materials.

Self-bound sodium chabazite aggregates can be prepared by the relatively simple technique of binding a precursor extrudate with a sodium aluminosilicate gel of appropriate composition, drying the extrudate, and converting a substantial portion of the binder to active sodium chabazite by a static hydrothermal treatment at modest temperatures (below 100° C.) and ambient pressure. Dynamic conversion by circulation of the aqueous solution enhances chabazite formation.

The self-bound aggregates in every case demonstrated ion-exchange, adsorptive and mechanical properties superior to those of the classically bound commercial aggregates. Surprisingly, the self-bound aggregate product actually exceeded the starting sodium chabazite in equilibrium capacities for adsorption and ion-exchange, the binder dilution effect being completely negated by the conversion process. The relevant capacities of the starting sodium chabazite were, in fact, increased by the binding/conversion process.

DESCRIPTION OF PREFERRED EMBODIMENTS OF THE INVENTION

Figure 1:
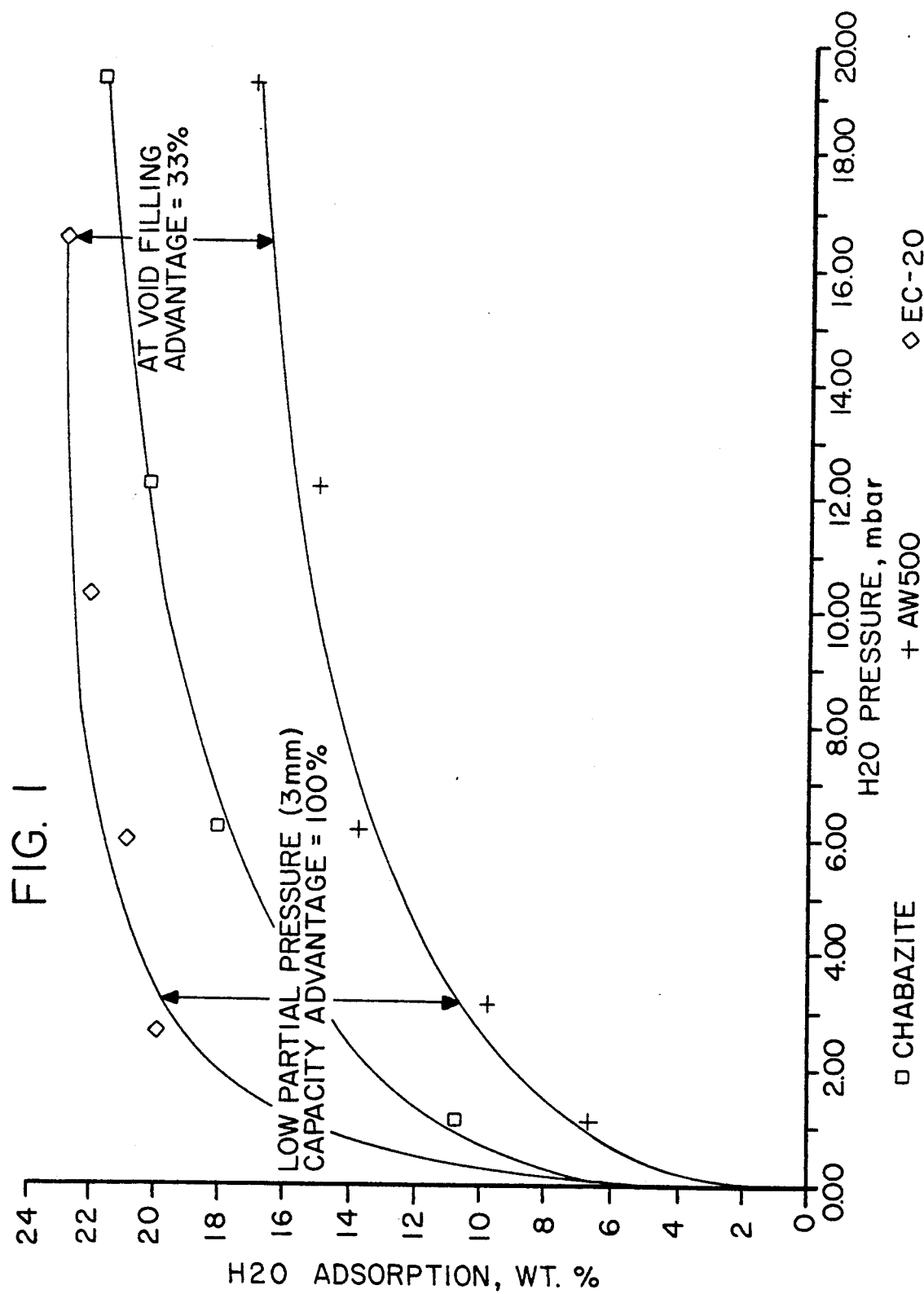
FIG. 1 is a set of comparative water adsorption isotherms (25° C.) for mineral chabazite, AW500 and the novel aggregates, EC-20.

In the preferred embodiment, ground chabazite powder is mixed intimately with a sodium-based aluminosilicate gel. The resultant paste is extruded into pellets, which are then dried completely. Dried pellets are treated in heated deionized water to convert the sodium aluminosilicate gel to additional chabazite. The converted pellets are washed, dried and calcined for final strengthening.

The ground chabazite feed is prepared by first crushing the fist size (−6 inch) lumps of raw chabazite ore to a maximum diameter of about ⅛ inch in a jaw crusher, roll crusher or other suitable device known in the art. The —⅛ inch material is further reduced in size, to at least 100% by weight less than 200 Mesh (U. S. Standard Sieve), but preferably to at least 90% by weight less than 325 Mesh and most preferably to 100% by weight less than 325 Mesh and more than about 50% by population less than 2 micrometers in diameter as measured on a Micromeritics SEDIGRAPH$^R$ 5000 particle size analyzer. Reduction to the final particle size can be done wet or dry using any appropriate device known in the art which would not contaminate the ground material with metal. Wet methods could include, for example, use of a wet ceramic ball mill or fine media mill or an autogenously operated high speed mixer. Dry methods could include, for example, use of a hammer mill with tungsten carbide contact surfaces. If grinding is done wet, the ground material will have to be filtered and dried before further use.

The ratio of gel to dehydrated chabazite (dried at 400° C. to constant weight) may range from 0.5 to 0.9, but is preferably between 0.6 and 0.8 and is most preferably about 0.7. The molar silicon-to-aluminum ratio in the gel can vary from 1 to 1.5 but is preferably from 1.1 to 1.4 and is most preferably about 1.2. The molar sodium-to-silicon ratio may be from 0.35 to 0.55, but is preferably between 0.4 and 0.5 and is most preferably about 0.45.

The gel is formed from deionized water, sodium aluminate flakes, sodium hydroxide pellets and N$^R$ brand sodium silicate solution or sodium disilicate (SDS) solution. Using the ratios of the most preferred embodiment and N brand sodium silicate solution as the source of silicon, the gel required for 1,000 grams of dehydrated chabazite or 1,210 grams of fully hydrated chabazite (21% reversible water capacity) would be composed of 519 grams of N brand solution, 40 grams of sodium hydroxide, 205 grams of sodium aluminate and sufficient deionized water to dissolve the two solids.

To form the gel, the sodium aluminate and the sodium hydroxide are dissolved in a suitable amount of deionized water. (The amount of water is not critical as the water will all be evaporated in carrying out this embodiment of the invention). The resultant solution is added to the sodium silicate solution, while the latter is being stirred from above. The resultant stiff gel is removed from the initial mixing vessel and placed in a WARING BLENDER ® mixer for final homogenization, on the lowest blender setting for one minute.

Generally, chabazite ores contain the zeolite minerals clinoptilolite and erionite as the major impurities, amounting to about 15% of the fully hydrated (air-equilibrated) weight of the chabazite. These two impurities are considered to be a source of silica and alumina for the growth of additional chabazite. The silica and alumina content of the two minerals (about 80% and 15%, respectively) was taken into account in the formulation of the gel composition. It was observed that the concentration of the two minerals was reduced in the final product.

In mixing prior to extrusion, the dry, ground chabazite is charged first to a high shear, low speed mixing mill such as a pug mill, a pin mill or a sigma blade mixer, or other suitable equipment known in the art. After the dry material is sufficiently mixed, or after lumps are sufficiently reduced in size in the case of the wet ground and dried material, the gel may be added slowly. Mixing of the wet ground and dried material is allowed to continue for at least 15 minutes, preferably for at least 30 minutes and most preferably for at least one hour. The gel is added over a period of at least 1 minute, but preferably over a 3 minute period and most preferably, over a period of at least five minutes. The gel is allowed to mix with the dry powder for at least five minutes, preferably at least 10 minutes and most preferably at least 15 minutes. After the gel and the powder are well mixed, deionized water is added to adjust the consistency of the mixture to the proper level. The pulp density of the mixture, expressed as weight per cent of fully hydrated (air-equilibrated) solids, may be 60 to 70% but is most preferably adjusted between 60 and 65% solids and is most preferably about 63% solids.

The paste resulting from the pulp density adjustment is extruded into the desired shape using a piston extruder, single screw extruder, twin screw extruder or other suitable machine known in the art. The moist extrudates are heated to complete dryness at a temperature of 100° to 200° C., but preferably from 125° to 175° C. and most preferably to about 150° C. The dried extrudate is treated for conversion of the gel to chabazite by exposure to deionized water at elevated temperature and ambient pressure. This exposure may be of a static nature, but dynamic exposure to flowing water is most preferred.

The amount of water used may be from 1 to 2 times the fully hydrated (air-equilibrated) weight of the dried and re-hydrated extrudates, but is preferably from 1.25 to 1.75 times the extrudate weight and is most preferably about 1.5 times the extrudate weight. Water temperature during exposure of the extrudates should be at least 90° C., but is preferably between 90 and 100° C. and is most preferably between 95° and 100° C. Extrudates may be exposed to the heated water for a time period of 2 to 10 hours, but are preferably exposed for 4 to 8 hours and are most preferably exposed for about 6 hours.

After exposure, the converted extrudates are washed with deionized water and dried using the procedure given for the unconverted extrudates above. As a final step to ensure maximum strength, the converted, dried extrudates are calcined at temperatures from 325° to 425° C., but preferably from 375° to 425° C. and most preferably about 400° C. The time required for effective calcination varies inversely with temperature. For a 400° C. calcining temperature, the calcining time is at least 30 minutes but preferably at least 45 minutes and most preferably at least 1 hour. Calcined extrudates, after cooling, are ready for testing and characterization.

If a macroporous or low density final product is desired, a starch or similar material may be added in the mixing mill in amounts up to 20% of the weight of the final extrudate. The starch will then be burned out of the extrudates in the calcining step. This procedure will yield porous extrudates, but also reduces crush strength.

EXAMPLE 1

Sodium aluminosilicate gel was prepared from 519 grams of N brand sodium silicate solution, 205 grams of sodium aluminate crystals, 40 grams of sodium hydroxide pellets and 500 milliliters of deionized water. The particular sodium silicate solution used analyzed 29.0% by weight $SiO_2$ and 9.1% by weight $Na_2O$, with the balance water. The gel was prepared by first dissolving the sodium hydroxide, then the sodium aluminate, in the deionized water. The sodium silicate solution was placed in a beaker outfitted with an overhead stirrer.

While the sodium silicate solution was stirring, the caustic sodium aluminate solution was poured in. This caused the creation of a stiff white gel from the two generally clear solutions. The stiff gel was finally homogenized by mixing in a WARING BLENDER mixer for one minute on the lowest speed setting.

High purity sodium chabazite ore was obtained from GSA Resources of Tucson, Ariz. The ore was wet ground to finer than 325 Mesh (U. S. Standard Sieve, 52 micrometers) in a ceramic ball mill, filtered, and dried. A 1,210 gram portion of the fully rehydrated (air-equilibrated) powder was blended with the sodium aluminosilicate gel.

The two components of the feed to extrusion were blended for 1 hour to ensure adequate mixing. Deionized water, in the amount of 810 grams, was added to give the mixture the proper consistency for extrusion. The well blended mixture was extruded without vacuum through a 1/16 inch die to form cylindrical pellets 1/16 inch in diameter and from 1/16 to ¼ inch in length. The wet pellets were dried overnight in air at 125° C.

A small sample of the unconverted extrudates thus prepared was subjected to a laboratory test for determination of reversible water adsorption capacity. The sample was heated at 400° C. for 2 hours. This temperature is known to be high enough to remove essentially all of the pore water from chabazite. The sample was weighed immediately after removal from the oven, and again after the weight had stabilized (usually after being left overnight). The reversible water adsorption capacity in the ambient atmosphere is expressed as the weight gain after complete dehydration as a percentage of the completely dehydrated weight of the sample. By this measure, pure chabazite should have a water capacity of about 25%. The ground chabazite ore used in this example has been found to have a water capacity of 21.0±0.5%. The extrudates containing the dried gel plus chabazite were found by the same means to have a capacity of 13.8% owing to dilution by the nonadsorptive gel.

Static exposure of 30 gram samples of extrudate to amounts of deionized water varying from 30 to 90 ml and temperatures ranging from 50° to 175° C. indicated that the binder would crystallize into sodium chabazite under appropriate conditions. For example, a set of conversions was performed with a water/extrudate ratio of 1.5 (45 ml of water) and a temperature of 95°±2° C., for static exposure times of 30 minutes to 8 hours. For each sample of converted pellets, the reversible water adsorption capacity was determined as above. X-ray powder diffraction patterns of all products were determined on a Phillips Model 3720 Automated X-ray Diffractometer using nickel filtered Cu Kα radiation. The relative concentration of chabazite in the samples was expressed as the height (in counts per second) of the characteristic chabazite peak at 5.02 Å. (This is not the strongest peak in the chabazite pattern but was chosen to avoid interference from analcime, which may form under conditions similar to those required for chabazite formation).

Water capacity and characteristic peak height data for the time series samples are shown in Table 1. Both pieces of data indicate that the maximum amount of chabazite was grown after six hours of treatment.

TABLE 1

X-ray Diffraction analyses and water capacity measurements on unconverted extrudates and various converted extrudates

| Sample Description | Reversible H2O Capacity | Chabazite* Index |
|---|---|---|
| Unconverted | 13.8% | 59 |
| ½ hr, static | 15.2 | 76 |
| 1 hr, static | 15.6 | 85 |
| 1½ hr, static | 16.0 | 85 |
| 2 hr, static | 16.9 | 96 |
| 3 hr, static | 17.3 | 98 |
| 4 hr, static | 18.4 | 98 |
| 6 hr, static | 19.2 | 100 |
| 8 hr, static | 18.0 | 92 |

*Height of chabazite peak at 5.02 A°. Peak selected for minimum interference from analcime.

After six hours, the height of the major analcime peak at 4.34 Å begins to increase rapidly while the height of the characteristic chabazite peak decreases, indicating that undesirable analcime will become the predominant phase if too long a treatment time is used. The maximum water capacity of 19.2% indicates both a significant improvement over the unconverted extrudates (13.8%) and a capacity approaching that of the unbound chabazite ore (21.0±0.5%).

EXAMPLE 2

In order to provide conditions more favorable for rapid and complete gel conversion, a dynamic conversion system was constructed wherein a fixed volume of deionized water was recycled continuously through a fixed bed of extrudates. A water volume of 788 ml was used for 525 grams of fully hydrated (air equilibrated) extrudate, giving a 1.5:1 ratio of water to solid extrudate. The solution was heated to 95°±2° C., then pumped through the extrudate bed at 2.0 liters per minute for four hours. The final product was washed with deionized water, dried at 125° C. for 1 hour, then calcined for 2 hours at 400° C. The water capacity of the converted aggregates, again measured as for the unconverted extrudates, was found to be 20.5%, within experimental error of the value for raw chabazite ore (21.0±0.5%).

EXAMPLE 3

To better assess the water adsorption performance of the converted extrudates, water adsorption isotherms were measured on a McBain-Bakr vacuum microbalance over the water pressure range of 2 to 25 millibar. Isotherms were also prepared for the raw chabazite ore and a potential competitive adsorbant, Union Carbide AW-500, which is a classically bound, mixed cation natural chabazite. Water isotherms for the three materials are compared in FIG. 1. The isotherms showed that the converted extrudates had a water capacity much higher than that of AW-500 over all pressures tested. The advantage at saturation, 22.0% vs. 17.0%, was nearly 30% relative to AW-500. The binder dilution effect which reduces the capacity of AW-500 was completely negated by the conversion process. Surprisingly, the converted extrudates also showed a small but significant capacity advantage over the raw mineral chabazite from which they were made.

EXAMPLE 4

Figure 2:
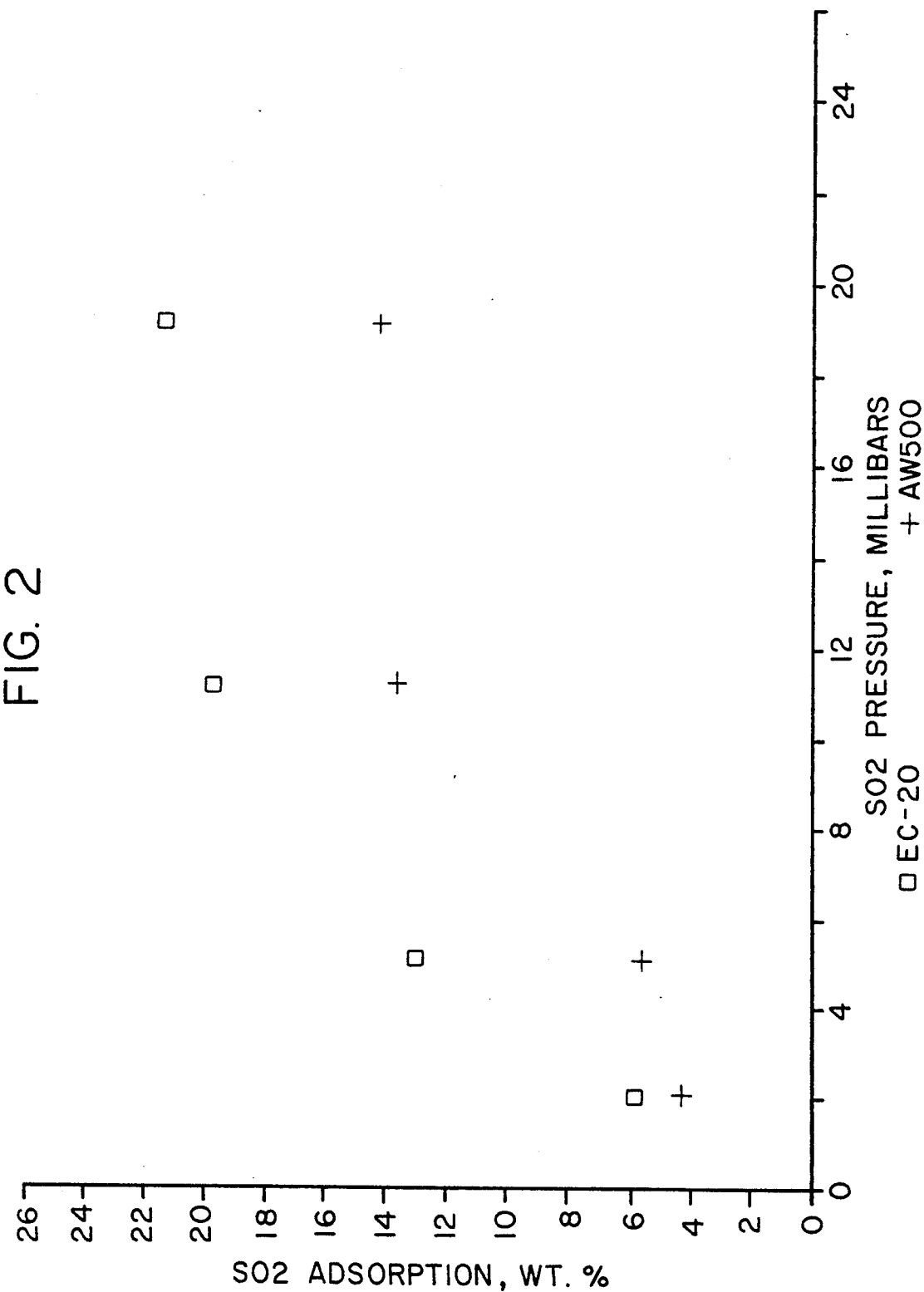
FIG. 2 is a set of comparative sulphur dioxide adsorption isotherms (25° C.) for AW500 and EC-20.

Sulfur dioxide adsorption isotherms were determined, again using the McBain-Bakr instrument, for the converted extrudates, AW-500 and raw chabazite powder. The sulfur dioxide adsorption isotherms of the three materials are compared in FIG. 2. Differences between the three materials were more pronounced than for the water adsorption isotherms. The capacity of the converted extrudates exceeded that of the AW-500 by more than 50% for all pressures up to saturation at about 25 mbar. Again, small but consistent improvement is noted for the converted extrudates over the starting mineral chabazite.

EXAMPLE 5

Capacity differences between the self-bound product and the starting sodium chabazite become more pronounced when ion-exchange capacity is examined. Cesium exchange tests were performed on air-equilibrated samples of starting sodium chabazite powder, self-bound aggregates and Linde AW500, with anhydrous weights of 2.0 g. Each sample was contacted with 40 ml of a chloride solution containing 5 g of cesium. The amount of cesium was chosen to be ten times the theoretical exchange capacity of pure chabazite (4 meq/g). Cesium loading was effected by soaking a sample in the cesium chloride solution for 48 hours. The cesium capacity of the powdered sodium chabazite was found to be $2.90 \pm 0.05$ meq/g in the presence of the excess cesium, compared to $2.15 \pm 0.05$ meq/g for the classically bound, mixed cation commercial Linde product. The self-bound product was found to have a capacity of $3.35 \pm 0.05$ meq/g under identical conditions, substantially and surprisingly greater than that of the starting sodium chabazite.

EXAMPLE 6

The mechanical strength of the self-bound aggregates also exceeded that of the commercial, classically bound chabazite, Linde AW500. Breaking strength tests on a Chatillon instrument with an anvil breaking head yielded an average crush strength of 3.5 pounds for the self-bound aggregates, compared to 1.7 pounds for the classically bound AW500 pellets of the same size. The strength advantage of the self-bound aggregates over the commercial product should increase as the extrusion technique for the self-bound aggregates is perfected.

We claim:

1. A process for making monolithic bodies of finely divided particles of naturally-occurring chabazite bonded with crystals of synthetic chabazite including the steps of:
   (a) forming a mixture comprising finely divided chabazite ore and a sodium aluminum silicate gel into monolithic bodies, the gel having a composition such that the molar ratio of silicon to aluminum is between 1.0 and 1.5 and the ratio of sodium to silicon ranges from 0.35 to 0.55;
   (b) recovering the resulting monolithic bodies;
   (c) and heating said bodies in the presence of water to a temperature above 80° C. for a period of time of sufficient duration to convert said gel to additional chabazite, thereby producing monolithic bodies of finely divided particles of naturally-occurring chabazite bonded with crystals of synthetic chabazite.

2. The process of claim 1 wherein said gel is converted to additional chabazite while said bodies are heated in the presence of water with agitation.

3. The process of claim 1 wherein said mixture is formed into monolithic bodies in step (a) by extrusion.

* * * * *